(Model.)

J. REESE.
Mechanism for the Transmission of Power by Metallic Belting.

No. 239,114. Patented March 22, 1881.

WITNESSES:
A. W. Schulding
Jno. K. Smith

INVENTOR
Jacob Reese
per
Frank M. Reese  ATTORNEY

UNITED STATES PATENT OFFICE.

JACOB REESE, OF PITTSBURG, PENNSYLVANIA.

MECHANISM FOR THE TRANSMISSION OF POWER BY METALLIC BELTING.

SPECIFICATION forming part of Letters Patent No. 239,114, dated March 22, 1881.

Application filed March 8, 1880. (Model.)

*To all whom it may concern:*

Be it known that I, JACOB REESE, of the city of Pittsburg, county of Allegheny, and State of Pennsylvania, have invented a new and useful Improvement in Mechanism for the Transmission of Power by Metallic Belting; and I do hereby declare the following to be a full, clear, and exact description thereof, reference being had to the accompanying drawings, in which—

Figure 1:
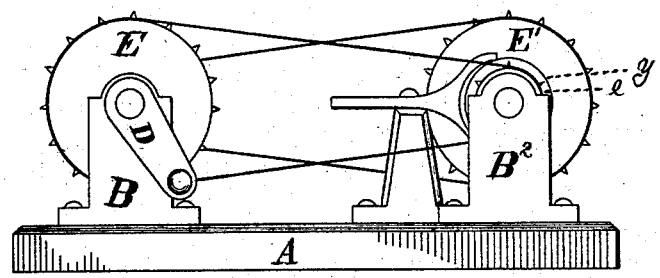
Figure 2:
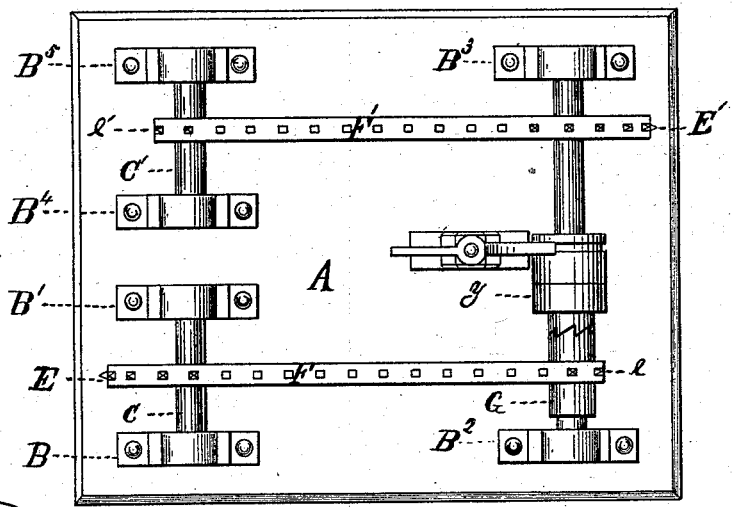
Figure 3:
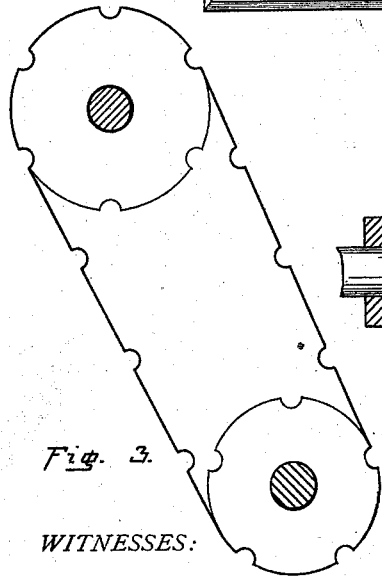
Figure 4:
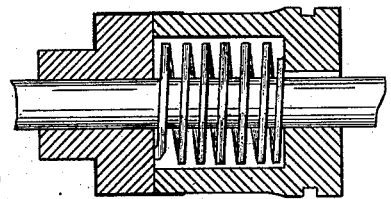
Figure 5:
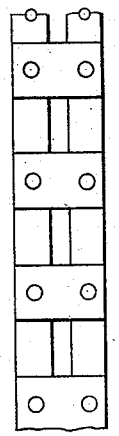

Figure 1 indicates an end view of the mechanism and metallic belting. Fig. 2 indicates a plan view of the same. Fig. 3 is an end view, showing a modified form of pulleys and belting. Fig. 4 indicates a sectional view of an adjustable spring-clutch. Fig. 5 indicates a section of a modified form of metallic belting.

Like letters indicate like parts wherever they occur.

Hitherto, in the transmission of motion from one shaft to another, leather and gum belting has almost entirely been employed. For ordinary use it is necessary that the motion should be transmitted rapidly, the rate varying from three hundred to five thousand feet per minute. This requirement has prevented the adoption of metallic belting for that class of work, and its use has been limited to the transmission of motion at low velocities, this being due to the following facts: The chain, being of an unyielding or non-elastic nature, is subjected to, and also subjects the remainder of the mechanism to, sudden, rapid, severe, and repeated shocks and jars in starting, stopping, and whenever increased work is put upon the mechanism, so that in a short time either the chain or the remainder of the mechanism becomes seriously deranged and breakage occurs. Chain belting is also not adapted for such purposes, as it is heavy, cumbersome, and great noise accompanies its use. The use of leather and gum belting is free from such objectionable features; but these materials have an exceedingly low tensile strength when compared with steel and other metals. Consequently the belts require to be much wider and thicker than would be the case if such materials could be employed, and the cost is also greater. Another objection to the use of gum and leather belting is that its ability to transmit power and motion is due solely to the traction upon the pulleys; whereas if metallic belting is employed it may engage directly upon projections upon the face of the pulleys, thereby securing a positive motion, and its effective force will then be governed by its tensile strength, and not merely by its traction, as in the preceding case.

Now, the object of my invention is to provide a cheap, simple, and efficient means for the transmission of motion either at a high or low rate of speed, and to overcome or obviate all the objectionable features which, as above specified, have characterized the employment of the chain belting. This object I have fully attained by the use, in combination with flexible perforated metallic belting and suitable pulleys, of an adjustable spring-clutch which is constructed and operates in a peculiar manner, being made in three sections, the first of which imparts the motion directly to the second, which is free to revolve around the shaft, and by its revolution coils or winds up a spiral spring until a point is reached at which the force exerted by the elasticity of the spring is sufficient to overcome the inertia of the part of the mechanism to which the motion is to be communicated, so that all the strain and shock are thrown directly upon and taken up by the spring, and the motion is imparted gradually to the mechanism until the full rate of speed is obtained.

In the drawings I have represented a machine for transmitting motion from a low to a high velocity.

A indicates the bed-plate. B B' B² B³ B⁴ B⁵ are standards or housings mounted thereon. In the standards B and B' is journaled the main driving-shaft C, which is provided with a crank, D, by which the power is applied.

E indicates the main driving-pulley, which, in common with all the other pulleys in the machine, is provided with a series of pyramidical projections to engage in the slotted portions of the belting.

G indicates an auxiliary shaft mounted in the standards B² and B³. This shaft is formed in two sections, which may be readily connected and disconnected by means of the adjustable spring-clutch $y$. This clutch is formed in three sections, the first being keyed firmly upon the shaft G at or near the small pulley e, its second section being fitted so as to allow it to revolve around the shaft and against the end of the barrel of the third section, which is firmly keyed onto that portion of the shaft to which motion is to be communicated by the clutch. In the barrel of the third section is a spiral spring surrounding the shaft. One extremity of the spring is attached to the second section and the other to the third.

E indicates a driving-pulley mounted upon the shaft G, and by which motion is transmitted, through the belt F', to the small pulley e' mounted upon the shaft G', which is journaled in the standards B⁴ and B⁵.

The operation of the machine is as follows: Power is applied to rotate the main shaft C. The projections upon the periphery of the pulley E engage in the slots of the metallic belt F, which, as it travels, engages the projections upon the face of the small pulley e and causes it and one section of the shaft G to rotate rapidly. When the clutch is adjusted to cause the motion to be imparted to the other section of the shaft G the motion is communicated from the first to the second section of the clutch, which by its revolution coils the spiral spring up to a point at which the torsional force is sufficient to cause that section of the shaft to rotate, and thereby impart motion to the pulley E', which, in its turn, imparts motion to the belt F', and thereby sets the remainder of the mechanism in motion.

From the foregoing it will be readily perceived that by the use of the improved clutch which I have described the strain in starting, stopping, and whenever increased work is put upon the machine will come gradually and evenly upon the belting and mechanism, so that the inertia and resistance will be overcome without the shock and jarring which characterize the use of chain belting and ordinary mechanism. The spiral-spring clutch also takes up lost motion and prevents backlashing.

In Fig. 3 a modified form of pulleys and belting is shown. The pulleys are provided at proper intervals with concave grooves or channels, which run transversely across its surface or periphery, and the metallic strip from which the belt is made has been bent so as to present convex projections upon its inner surface at corresponding intervals to engage in the grooves or furrows in the face of the pulleys.

Fig. 5 indicates another modification in the form of belting, in which the belt is formed of two strips of flexible metal, which are joined at proper intervals by strips riveted transversely across its surface.

In practice it is purposed to use the modification shown in Fig. 3 in some cases where the work to be performed is very light, and to use the modification shown in Fig. 5 for heavy work, where the belts are of a size to render it an object to save material by its adoption. In all ordinary cases the form first described is preferable.

In making the belts light flexible metal is used—steel by preference. For a small belt—say of one and one-quarter inch in width—I take a strip of one and one-quarter by twenty-two wire gage, and of proper length to form the band, and punch out at proper intervals along its center a series of slots about one-fourth inch in width and about one and one-half inch in length, so that they may readily engage the projections upon the face of the pulleys. The distance apart at which the slots are will depend upon the distance apart at which the projections are upon the face of the pulleys, and it will be readily understood by the skilled workman that the projections must be of exactly the same distance apart from each other and upon each pulley upon which the belt works. Therefore the circumference of both the large and small pulley must be a multiple of the distance at which the projections are separated—that is, measuring from the center to the center of the projections. After the strip has been punched, as described, the ends are riveted and the belt is ready for use.

If the belt is required to perform heavy work, the small pieces punched out from the band may be doubled and slipped over the edge of the perforations, upon which the direct strain from the projections will come, so as to give body to the belt at those points. The pieces may be pressed down or riveted to keep them in position.

The advantages of the flexible metallic belting over leather and gum belting are as follows: The tensile strength of the best belt-leather is only about three thousand and eighty pounds to the square inch. A one-inch leather belt seven thirty-seconds of an inch in thickness will rupture through the solid part at a strain of six hundred and seventy-five pounds, through the rivet-holes at three hundred and eighty-two, and through the lace-holes at two hundred and ten pounds. For all ordinary practical purposes the strain cannot be calculated at over two hundred pounds, and the belt may give way in some cases at a strain not exceeding sixty-two pounds to the inch width of belt. Now, in the form of belt first described we have at the weakest point—i. e., at the perforated portions—one inch of No. 22 steel to resist the strain. The tensile strength of the steel is about ninety thousand to the square inch, which would give a resistance to a strain of three thousand five hundred and seventy-five pounds upon the belt before rupture would take place, so that it will readily be seen that the resistance would be about fifteen times greater than the leather belt, and consequently the size of the belting may be greatly decreased.

Another advantage is as follows: The effective force exerted by the movement of the leather and gum belting depends upon its traction upon the pulleys; consequently it must be drawn exceedingly tight. This strain greatly increases the friction of the shafts upon their journals, and a considerable loss of power is the result; whereas when the metallic belting is employed it is not necessary to draw it tightly, and the loss of power is avoided.

Another advantage of this invention is as follows: Its ability to transmit motion is uniform and constant; whereas leather and gum belting gradually loses its ability as the material stretches and the belt loosens upon the pulleys.

The improved mechanism and metallic belting will be found to be peculiarly adapted to the transmission of motion in flour and other similar works. Heretofore gearing has been almost entirely employed, as the flour-dust settles upon the leather or gum belting and is carried onto the pulley-faces and becomes dry and cakes upon the face of both the belt and pulleys, thereby causing the belt to slip to such an extent as to deprive it of its ability to transmit the motion; but in the use of my improvement no such difficulty exists, as the effective force of the belt does not depend upon the traction of its surface upon the pulleys.

A friction-pulley may in some cases be employed in the mechanism to relieve it from the shock, strain, and jar in starting and stopping; but I do not recommend its use, merely noting the fact that it will answer as a member of the combination.

I am aware that metallic belts for giving positive motion to pulleys have heretofore been employed in transmitting power, and do not claim the same, as they are not, when used alone, well adapted to resist the shocks and strains to which they are subjected in overcoming the inertia of machinery. I am also aware that a coiled-spring sectional clutch has been devised to neutralize the effect of sudden shocks which might injure the clutch, and do not herein claim such a clutch; but I am not aware that a metallic belt having provision for giving positive motion to a pulley has been combined with a pulley having a compensating or yielding clutch, whereby the use of metallic belting for giving positive motion to pulleys has been rendered practical. Therefore, Having described my invention, what I desire to claim, and wish to secure by Letters Patent, is—

In mechanism for transmitting power, the combination of a flexible metallic belt provided with slots or projections, a pulley or pulleys provided with depressions or projections corresponding to the counterparts of the belt, and a compensating clutch, arranged and operating substantially as and for the purpose specified.

JACOB REESE.

Witnesses:
FRANK M. REESE,
GRAHAM SCOTT.